United States Patent
Kimura

(10) Patent No.: US 8,102,381 B2
(45) Date of Patent: Jan. 24, 2012

(54) DISPLAY SYSTEM AND METHOD OF RESTRICTING OPERATION IN SAME

(75) Inventor: Mitsuo Kimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 775 days.

(21) Appl. No.: 12/226,220

(22) PCT Filed: Mar. 1, 2007

(86) PCT No.: PCT/JP2007/053939
§ 371 (c)(1),
(2), (4) Date: Oct. 10, 2008

(87) PCT Pub. No.: WO2007/141941
PCT Pub. Date: Dec. 13, 2007

(65) Prior Publication Data
US 2009/0160732 A1    Jun. 25, 2009

(30) Foreign Application Priority Data
Jun. 5, 2006 (JP) .................................. 2006-156253

(51) Int. Cl.
G09G 5/00 (2006.01)
(52) U.S. Cl. ........ 345/173; 345/156; 345/157; 345/174; 701/200
(58) Field of Classification Search ............... 345/1.1, 345/1.2, 156, 157, 173–178; 701/200
See application file for complete search history.

(56) References Cited

U.S. PATENT DOCUMENTS

| 6,653,948 | B1 | 11/2003 | Kunimatsu et al. | |
| 7,397,463 | B1 * | 7/2008 | Kishi et al. | 345/173 |
| 7,567,222 | B2 * | 7/2009 | Tanaka et al. | 345/7 |
| 7,969,423 | B2 * | 6/2011 | Kawabe | 345/173 |
| 2003/0220725 | A1 * | 11/2003 | Harter et al. | 701/36 |
| 2008/0068284 | A1 * | 3/2008 | Watanabe et al. | 345/1.1 |

FOREIGN PATENT DOCUMENTS

| JP | 4-291697 A | 10/1992 |
| JP | 8-69502 A | 3/1996 |
| JP | 2000-346651 A | 12/2000 |
| JP | 2002-49461 A | 2/2002 |
| JP | 2005-71286 A | 3/2005 |
| JP | 2005-284592 A | 10/2005 |
| JP | 2006-29917 A | 2/2006 |
| JP | 2006-103357 A | 4/2006 |
| JP | 2006-106851 A | 4/2006 |
| WO | WO 2006/005424 | 1/2006 |

* cited by examiner

*Primary Examiner* — Quan-Zhen Wang
*Assistant Examiner* — Jennifer Nguyen
(74) *Attorney, Agent, or Firm* — Birch, Stewart, Kolasch & Birch, LLP

(57) ABSTRACT

A control section 10 makes a judgment about which occupant the menu icon of an operation restricted item is operated by, and thereby makes invalid the operation of a touch panel related to the operation restricted item by an occupant on a driver's seat side while a vehicle is moving by using any means of the operation of a push switch 171 provided at a position where only an occupant on a passenger seat side can operate; the touch operation or drag-and-drop operation of a marker of any shape displayed at any position of a passenger seat side screen; monitoring by an infrared sensor array 164 disposed in the peripheral portion of an LCD panel 162; and monitoring the occupant on the driver's seat side by a monitoring camera 172 disposed at a position where the camera can monitor the direction toward which the face of the driver's seat side occupant is facing.

16 Claims, 12 Drawing Sheets

DISPLAY SYSTEM AND METHOD OF RESTRICTING OPERATION IN SAME

TECHNICAL FIELD

The present invention relates to a display system provided with a display means that simultaneously displays an image having a first viewing angle and an image having a second viewing angle different from the first viewing angle, and that has an operation face provided on the display screen thereof, and a method of restricting an operation in the system.

BACKGROUND ART

A dual view liquid crystal display can simultaneously display an image having a first viewing angle and an image having a second viewing angle different from the first viewing angle. In other words, the viewing angle of the liquid crystal display monitor is controlled, thus enabling simultaneously displaying different information or contents on the right and left sides thereof.

Therefore, when a dual view liquid crystal monitor is used as a display monitor of a navigation system, one LCD can display visuals different from each other on the right and left sides of the display, respectively, in such a way that a navigation screen, for example, can be seen by an occupant on a driver's seat side and a DVD (Digital Versatile Device) cinema screen can be seen by another occupant on a passenger seat side.

Further, the dual view liquid crystal can form a display-input apparatus by being combined with an operation face (touch panel) disposed on the front face of a display panel, and it becomes possible for an occupant including a driver to communicate with the main body of a navigation system by touching an icon menu or the like displayed on the dual view liquid crystal. For this reason, a touch panel is mounted on a navigation system as a human interface having an excellent operability separately from a console or a remote controller in existence and has been distributed to the market as a touch-panel-equipped navigation system.

Meanwhile, in a conventional touch-panel-equipped navigation system using a dual view liquid crystal, icons having the same menu configuration are displayed on both of the screen viewed from a driver's seat side (hereinafter, referred to as a driver's seat side screen) and the screen viewed from a passenger seat side (hereinafter, referred to as a passenger seat side screen). However, a menu of which all items can be selected is displayed on the passenger seat side screen, while a menu containing operation-restricted items in part is displayed on the driver's seat side screen, with the operation-restricted items being displayed with colors or designs different from those of other items.

In this case, it is necessary for the main body of the navigation system to make a determination about which of the images the operation performed to only one touch panel is effective to and exercise the display control such that each of the occupants can see and listen to the desired content by performing touch operation even during performing a dual view display.

However, it is very difficult to make a determination about which occupant carried out the operation. The method such as providing, for example, a selector switch thereon seems like a useful one. But, whenever the touch panel is operated, operating the selector switch is required. This increases the complexity of the operation and disadvantageously loses the advantage of the touch panel of allowing an intuitive touch operation.

For this reason, conventionally, a display system is disclosed, where a touch panel is placed in a state where an area exclusively used by the touch of a viewer A and an area exclusively used by the touch of a viewer B are separated therefrom so as not to be in a superposed relation and a determination about which viewer operated can be made depending on the operating area (see Patent Document 1 and Patent Document 2, for example).

Patent Document 1: JP-A-2005-071286 (Paragraph "0011" and FIG. 1)

Patent Document 2: JP-A-2005-284592 (Paragraphs "0010" to "0016," and FIG. 2)

However, according to the technology disclosed in Patent Document 1 and Patent Document 2, the operation area is merely separated and allocated to each of the viewers (the occupants including the driver), and for example, if the viewer A wrongly operates the operation area assigned to the viewer B, the operation is misjudged to be the operation of the viewer B, with the display on the side of the viewer B being switched to an unintended one.

Thus, according to the conventional touch-panel-equipped navigation system, a determination about which image the operation of the touch panel is effective to is not made. Accordingly, if the icon to which the operation performed is effective to the image on the other side that is not actually viewed from the left side (the right side in the case of a left-hand drive vehicle) is displayed, the operation to the icon can be accidentally carried out by touching the corresponding place.

To be more specific, if an operation-restricted item in the driver's seat side screen is in a superimposed relation with a selectable item in the passenger seat side screen, the operation from the driver's seat side causes the passenger seat side screen to be operated. There is a problem that the image on the passenger seat side is switched to an unintended one.

The present invention has been made to solve the above-mentioned problems, and objects of the present invention are to provide a display system where the occurrence of the situation where an unintended image is displayed on the passenger seat side is prevented by making a determination about which of an occupant on the driver's seat side and an occupant on the passenger seat side operated a touch panel while a dual view is displayed, and further to provide a method of restricting operation in the display system.

DISCLOSURE OF THE INVENTION

The display system according to the present invention includes a display means that simultaneously displays an image having a first viewing angle and an image having a second viewing angle different from the first viewing angle, and that has an operation face provided on the display screen thereof; an operator discriminating means discriminating one operator of the operation face of the display means from the other thereof; a traveling state judging means making a judgment whether a vehicle is in a traveling one; and a control means causing the display means to display a menu image of operation items containing an operation restricted item of the same menu configuration at both of the first viewing angle and the second viewing angle; wherein the control means, when the operator discriminating means determines that an operation is the operation performed by a driver, and the traveling state judging means judges that the vehicle at that time is in a traveling state, makes invalid an operation related to the operation restricted item contained in the operation items having the first viewing angle which the display means is caused to display.

The method of restricting the operation in the display system according to the present invention includes the method of restricting an operation in a display system including a display means that simultaneously displays an image having a first viewing angle and an image having a second viewing angle different from the first viewing angle, and that has an operation face provided on the display screen thereof, wherein a control apparatus controlling the display system performs the steps of: causing the display means to display the menu image of operation items containing an operation restricted item of the same menu configuration at both of the first viewing angle and the second viewing angle; and making invalid an operation related to the operation restricted item in the operation items having the first viewing angle which the display means is caused to display, when the control apparatus determines that the operation of the operation face of the display means is the operation carried out by a driver, and further, judges that a vehicle is in a traveling state.

The present invention permits the occurrence of the situation where an unintended image is displayed on the passenger seat side to be prevented by making a determination about which occupant the menu of the operation restricted item is operated by, while a dual view is displayed, and further making invalid the operation of the touch panel related to the operation restricted item by an occupant on the driver's seat side while the vehicle is moving.

BEST MODE FOR CARRYING OUT THE INVENTION

Embodiments of the present invention will now be described with reference to the accompanying drawings in order to explain the present invention in more detail.

First Embodiment

The touch-panel-equipped navigation system in accordance with the first embodiment of the present invention is arranged such that a switch, namely a push switch 171, disposed at a position where only an occupant on a passenger seat side can operate is connected with a control section 10 as an external unit 17, and is used.

Figure 3:
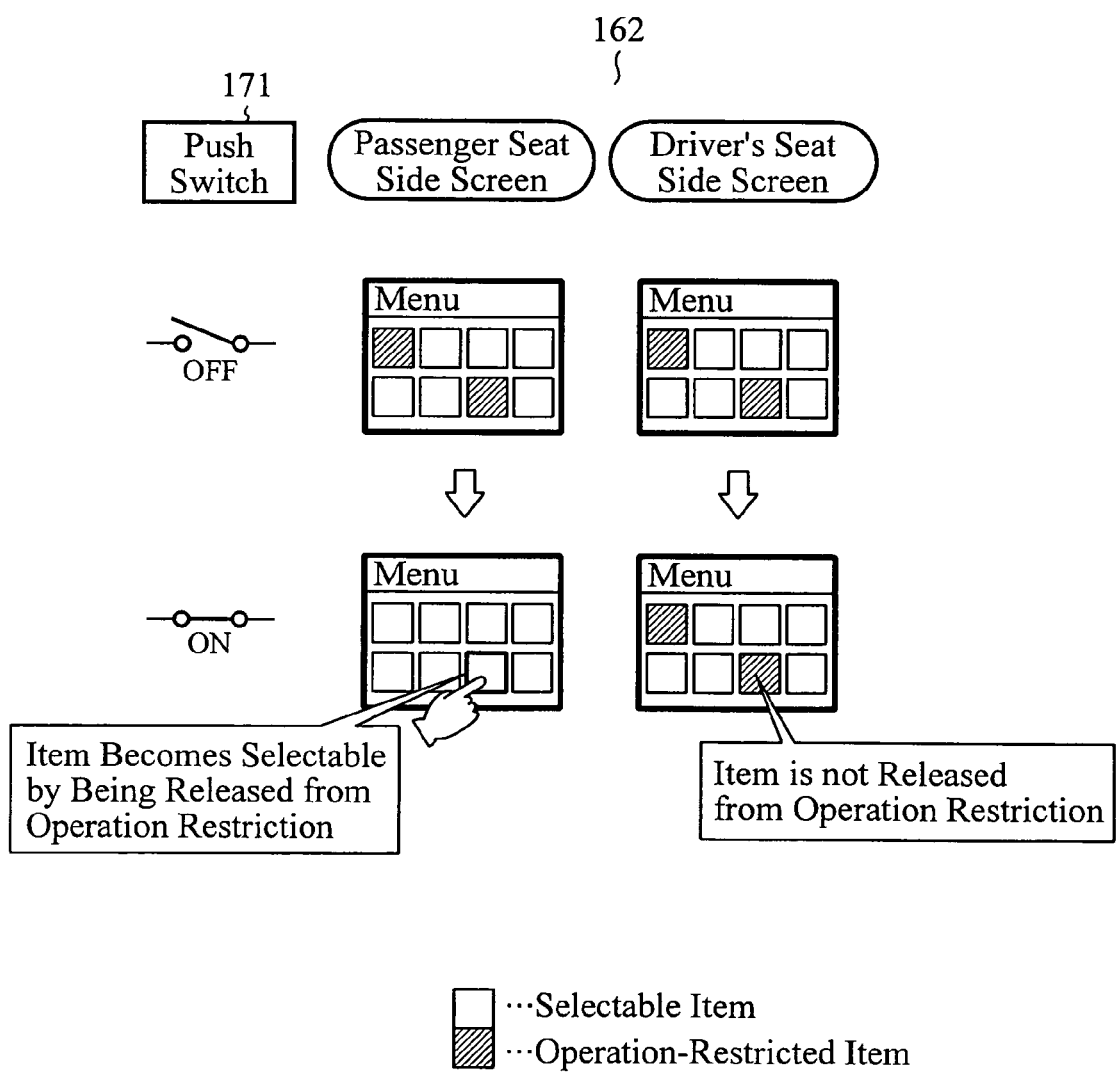
FIG. 3 is a conceptual diagram in operation based on the configuration of the menu screen of the touch-panel-equipped navigation system in accordance with the first embodiment of the invention.
Figure 4:
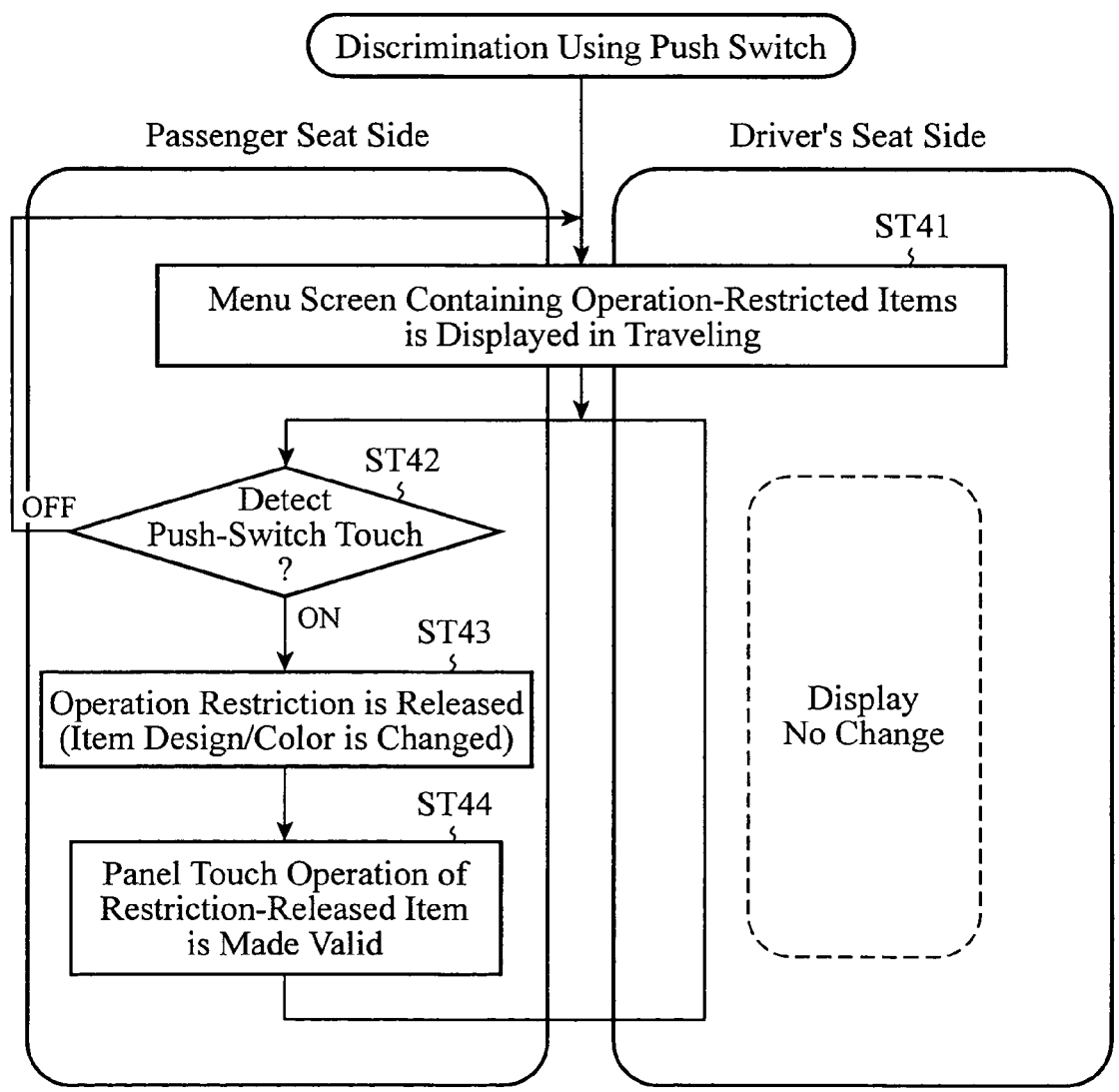
FIG. 4 is a flowchart for explaining the operations of the touch-panel-equipped navigation system in accordance with the first embodiment of the invention, cited by way of example.

A switch-touch detector 104 of the control section 10 detects that the push switch 171 is turned on and informs it to an operation discriminating section 100; the operation discriminating section 100 thereby controls an operation restriction control section 101 to release the operation restricted item displayed on the passenger seat side screen only while the switch is pressed or touched by the occupant on the passenger seat side, and makes valid the operation of a touch panel 145 by the occupant on the passenger seat side. FIG. 3 is a conceptual diagram of the operations thereof shown in the configuration of the menu screen thereof, and FIG. 4 shows the operations of the control section 10 seen from the passenger seat side and the driver's seat side with a flowchart.

Figure 1:
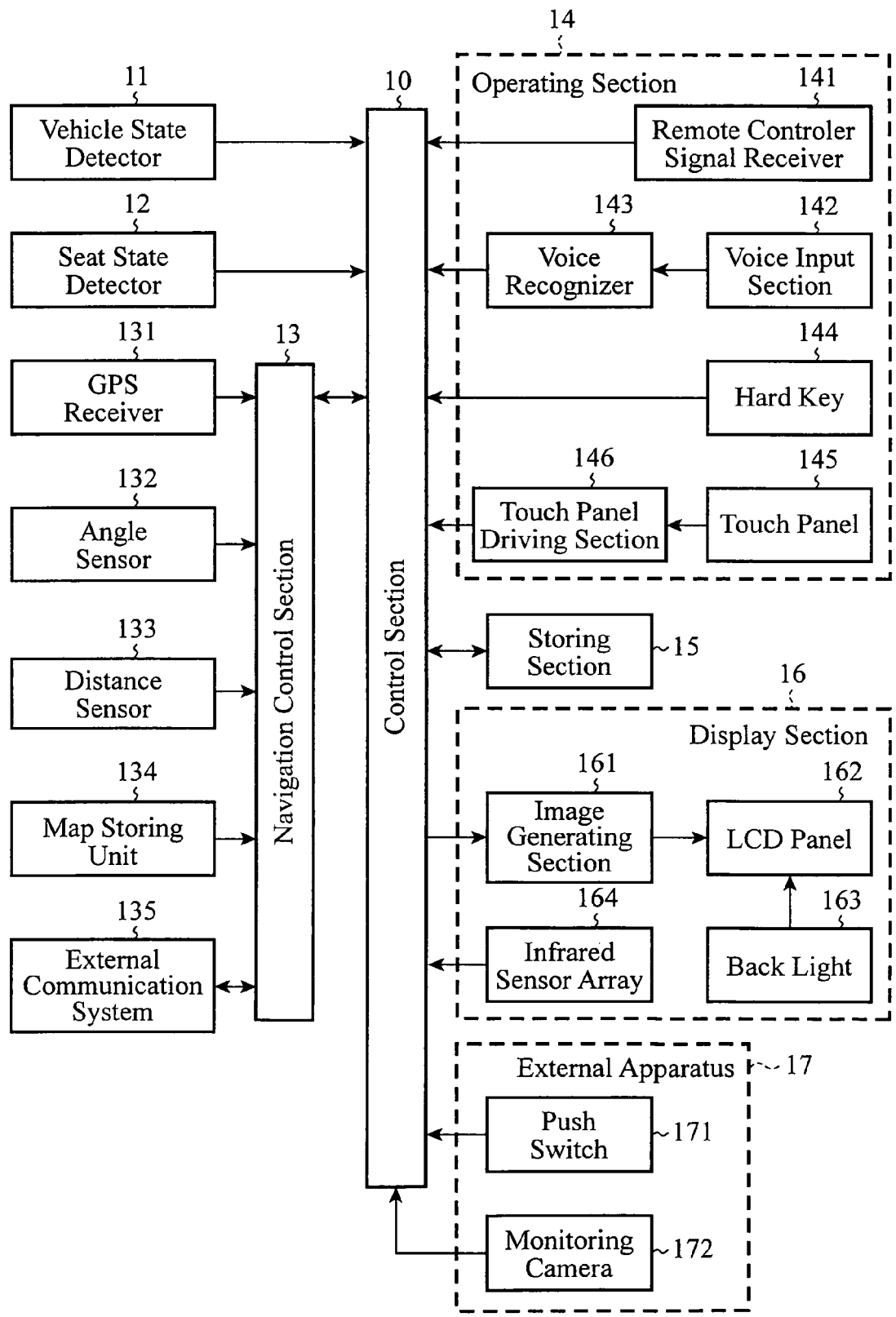
FIG. 1 is a block diagram of an internal configuration commonly used in each embodiment of a touch-panel-equipped navigation system according to the present invention.

FIG. 1 is a block diagram showing the internal configuration of the touch-panel-equipped navigation system functioning as a display system commonly used in each embodiment of the present invention.

The touch-panel-equipped navigation system shown in FIG. 1 uses the control section 10 (operator discriminating means and control means) as a core, and is composed of a vehicle state detector (traveling state judging means) 11, a seat state detector 12, a navigation control section 13, an operating section 14, a storing section 15, a display section (display means) 16, and the external unit 17.

The operation of the touch-panel-equipped navigation system in accordance with the first embodiment of the present invention will be explained by referring to FIG. 1 to FIG. 4 hereinlater.

In this case, the push switch 171 is disposed at a position where just the occupant on the passenger seat side can operate. However, it is assumed that the push switch 171 is turned on just while being touched and cannot be held in an on-state.

The vehicle state detector 11 detects the state of the vehicle, particularly detects whether the vehicle is in traveling state or stopping state based on the information obtained from ECUs (electronic control units) and various sensors mounted on each portion of the vehicle such as information about the position of the drive key, shift position, parking brake, signal of vehicle speed, and so on, and outputs it to the control section 10.

Further, the seat state detector 12 obtains information from the seat state sensors provided on and under each of the driver's seat and the passenger seat to detect the seat states of the occupants, and outputs the information to the control section 10.

Meanwhile, the navigation control section 13 determines the current position of the vehicle by using the sensors installed in each portion of the vehicle such as a GPS (Global Positioning System) receiver 131, angle sensor 132, distance sensor 133 or map storing unit 134, external communication apparatus 135, and so on, and performs the functions as the main body of the navigation system such as route search and destination guidance by cooperating with the control section 10.

Further, the operating section 14 includes at least one operating means out of a remote controller, speech recognizer, hard key, and touch panel, and plays a role, when it is operated by the occupant, as a man-machine interface transmitting an occupant's intention to the navigation control section 13 or control section 10. The signals received through a remote-controller signal receiving section 141 in the remote controller, through a voice input section 142 and a speech recognizer 143 in the voice recognition, directly from a hard key 144, and through the touch panel 145 and a touch panel driving section 146 in the touch panel, respectively, are output to the control section 10. Especially, in this case, the touch panel 145 is assumed to be used as the operating section 14, while the other units are configured to serve as options.

The storing section 15 stores various setting information in advance, and further functions as a working space when the control section 10 executes stored programs. As concerns the present invention, candidates for the display positions of a marker described later are stored therein in a tabular form.

As described above, the display section 16 includes an LCD panel 162 capable of dual view display producing displays different from each other on the driver's seat side screen and the passenger seat side screen (the screens viewed from different viewpoints), respectively, and here, displays menu icons, in addition to image contents, including the operation restricted items in the same menu configuration on both of the driver's seat side screen and the passenger seat side screen while the vehicle is traveling under the control by the control section 10 described later. The display section 16 is composed of an image generating section 161 generating image contents and menu icons under the control by the above-described control section 10; the LCD panel 162 displaying the dual view of the image generated by the image generating section 161; and a back light 163 sharpening the chromatic display by projecting thereon the color filter (not shown) provided on the LCD panel 162 from the back thereof.

In addition, reference numeral 164 denotes an infrared sensor array, which is assumed to be disposed in the shape of an array in the peripheral portion of the LCD panel 162 in order to observe the state where the touch panel 145 is operated by the occupant on the driver's or passenger seat side. Detailed explanation will be given thereabout later.

The control section 10 has the function of determining the working conditions based on the input information from each of blocks 11, 12, 13, 14, 15, and 16 described above and from the external unit 17 described later, and further controls the entire-display control, in this case, together with the functions as the control means of making a determination about which occupant the menu of the operation restricted item is operated by; and making invalid the operation of the touch panel related to the operation restricted item by the occupant on the driver's seat side while the vehicle is moving.

Additionally, the display section 16 displays a menu including the operation restricted item in the same menu configuration on both of the driver's seat side screen and the passenger seat side screen while the vehicle is traveling under the control by the control section 10; however, in order to make a determination about which occupant the menu of the operation restricted item is operated by, the control section 10 makes the determination by obtaining the signal from at least one of the push switch 171 and monitoring camera 172 connected thereto as the external unit 17, and the infrared sensor 164 of the display section 16.

Figure 2:
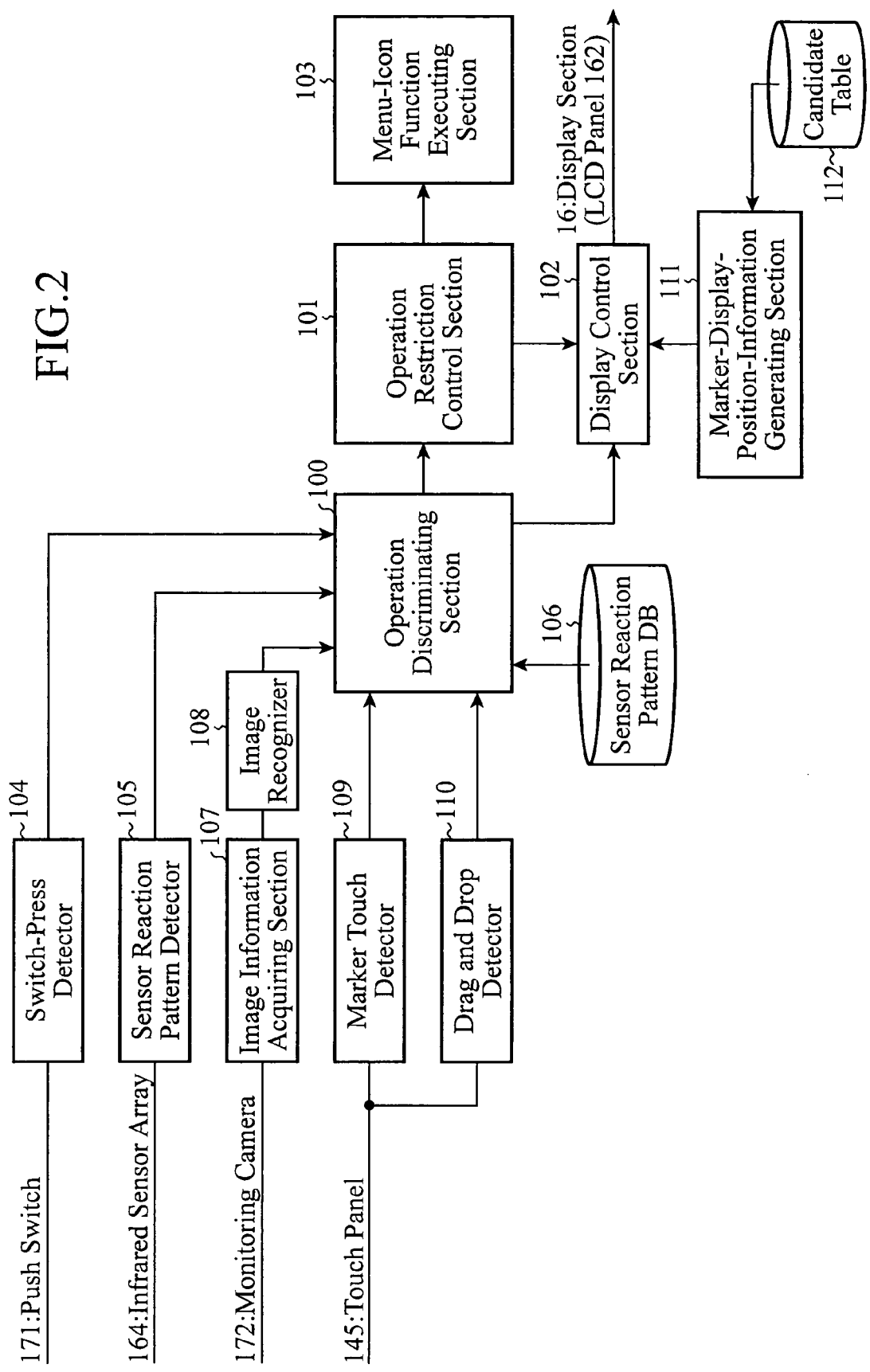
FIG. 2 is a block diagram of the functions of a control section in the touch-panel-equipped navigation system according to the invention.

FIG. 2 is a block diagram showing the internal configuration of the control section 10 shown in FIG. 1 by deploying the functions thereof. When deploying the functions of the control section 10, it is composed of the operation discriminating section 100, the operation restriction control section 101, a display control section 102, a menu-icon function executing section 103, the switch-touch detector 104, a sensor reaction pattern detector 105, a pattern DB 106, an image information acquiring section 107, an image recognizing section 108, a marker touch detector 109, a marker drag-and-drop detector 110, a marker-display-position-information generating section 111, and a candidate table 112.

The operation discriminating section 100 has the function of making a determination about which of the occupants on the driver's seat side and the passenger seat side the menu icon of the operation restricted item displayed on the LCD panel 162 is operated by, corresponding to the signal outputted by any of the switch-touch detector 104 described later, sensor reaction pattern detector 105, image recognizing section 108, marker touch detector 109, and drag-and-drop detector 110, and controls the operation restriction control section 101 and the display control section 102 accordingly.

The operation restriction control section 101 has the functions of releasing the operation restricted item displayed on the passenger seat side screen by the output of the operation discriminating section 100 and making valid the operation of the touch panel 145 by the occupant on the passenger seat side, and controls the menu-icon function executing section 103 based on the result. The menu-icon function executing section 103 is a control means performing the functions previously defined, corresponding to each of the menu icons, for instance, the functions pertinent to navigation, DVD reproduction, and radio reception.

The display control section 102 controls the entire display control of the liquid crystal panel 162 of the display section 16, and further in this case generates information for displaying the same menu icons on both of the driver's and passenger seat side screens, and also the display control section, when a command for releasing the operation restricted item is issued by the operation restriction control section 101, generates information for changing the design or the display color of the corresponding restriction item menu icon and outputs it to the liquid crystal panel 162.

The display control section 102 furthermore generates information for displaying a marker of any shape at random, and more specifically, displays the marker at the XY coordinates position generated by the marker-display-position-information generating section 111. At that time, the candidate table 112 assigned to the storing section 15 is referred to. Detailed explanations thereof will be given later.

In this context, the switch-touch detector 104 detects that the push switch externally connected thereto is touched, and outputs the information to the operation discriminating section 100. Moreover, the sensor reaction pattern detector 105 acquires a reaction pattern of the infrared sensor array 164 provided in the peripheral portion of the LCD panel 162, compares the reaction pattern with the reaction patterns previously registered in the reaction pattern DB 106, and outputs the result to the operation discriminating section 100.

The image information acquiring section 107 outputs the image information shot and acquired by the monitor camera 172 externally connected thereto to the image recognizing section 108, and the image recognizing section 108 outputs the image recognition result to the operation discriminating section 100. The marker touch detector 109 detects that the marker displayed at any position of the LCD panel 162 is touched by the occupant, and the drag-and-drop detector 110 detects the drag-and-drop operation of the marker carried out by the occupant and outputs the information together with the coordinate information thereof to the operation discriminating section 100.

As shown in FIG. 3, when the vehicle is traveling and the push switch 171 is turned off, the menu icons containing the operation restricted items are displayed in the same menu configuration on both of the driver's seat side screen and the passenger seat side screen. The hatched icon in FIG. 3 is assumed to be an icon to which the operation restricted item is assigned, and the not-hatched icon therein is assumed to be an icon to which a selectable item is assigned.

At this point, in operating the operation restricted item icon by using the passenger seat side screen, the occupant on the passenger seat side first touches (turns on) the push switch 171. The control section 10 detects that the push switch 171 is touched, and releases the operation restricted item displayed on the passenger seat side screen only while the push switch 171 is touched. In this way, the operation of the touch panel 145 carried out by the occupant on the passenger seat side is made valid, and the operation restricted item icon assigned to the touch panel 145 becomes selectable.

Specifically, as shown in the flowchart of FIG. 4, the control section 10 first starts the display control section 102, and commands the display control section to display the menu icons containing the operation restricted item in a dual view on both of the driver's seat side screen and the passenger seat side screen. In this way, the LCD panel 162 thereby displays the menu icons shown therein in a dual view under the control of the display control section 102 (step ST41).

Subsequently, the switch-touch detector 104 of the control section 10 detects the touch of the push switch 171 (step ST42), and the operation determining section 100, when the push switch 171 is turned on and further the menu icon to which the operation restricted item is assigned is touched, determines that the operation is carried out by the occupant on the passenger seat side, and releases the operation restricted item through the operation restriction control section 101 (step ST43). The release of the operation restricted item is informed to the passenger seat occupant by changing the design or display color of the corresponding menu icon in the LCD panel 162 under the control by the display control section 102, thus enabling the operation of the touch panel 145 of the part where the operation restriction is released (step ST44). Note that there occurs no change in the menu display of the driver's seat side screen at that time.

As mentioned above, in accordance with the first embodiment, a determination to be made about which of the occupants on the driver's seat side and passenger seat side is operating the touch panel 145 by detecting that the push switch 171 is touched, thus enabling the restriction of the operation of the touch panel 145 by the driving occupant on the driver's seat side (driver). For this reason, there is obtained an advantageous effect that the influence exerted on the passenger seat side screen due to the fact that the occupant on the driver's seat side operated the touch panel 145 is eliminated.

It should be noted that the push switch 171 is disposed at a position the occupant on the driver's seat side does not reach, for instance, in the vicinity of the door on the passenger seat side, which completely eliminates the possibility that the occupant on the driver's seat side touches the push switch 171 while the vehicle is moving.

Second Embodiment

The touch-panel-equipped navigation system in accordance with the second embodiment of the present invention is arranged such that the control section 10 displays a marker of any shape, here a marker ☆ at any display position of the LCD panel 162 (on the passenger seat side screen) through the display control section 102. At that time, the operation determining section 100, when it detects through the marker touch detector 109 that the marker ☆ is touched, controls the operation restriction control section 101 to release the operation restricted item displayed on the passenger seat side screen, and makes valid the operation of the touch panel 145 by the occupant on the passenger seat side.

Thus, the second embodiment uses a marker displayed on the screen as an alternative to the push switch 171 shown in the first embodiment, and thereby obtains an equivalent effect thereto.

Figure 5:
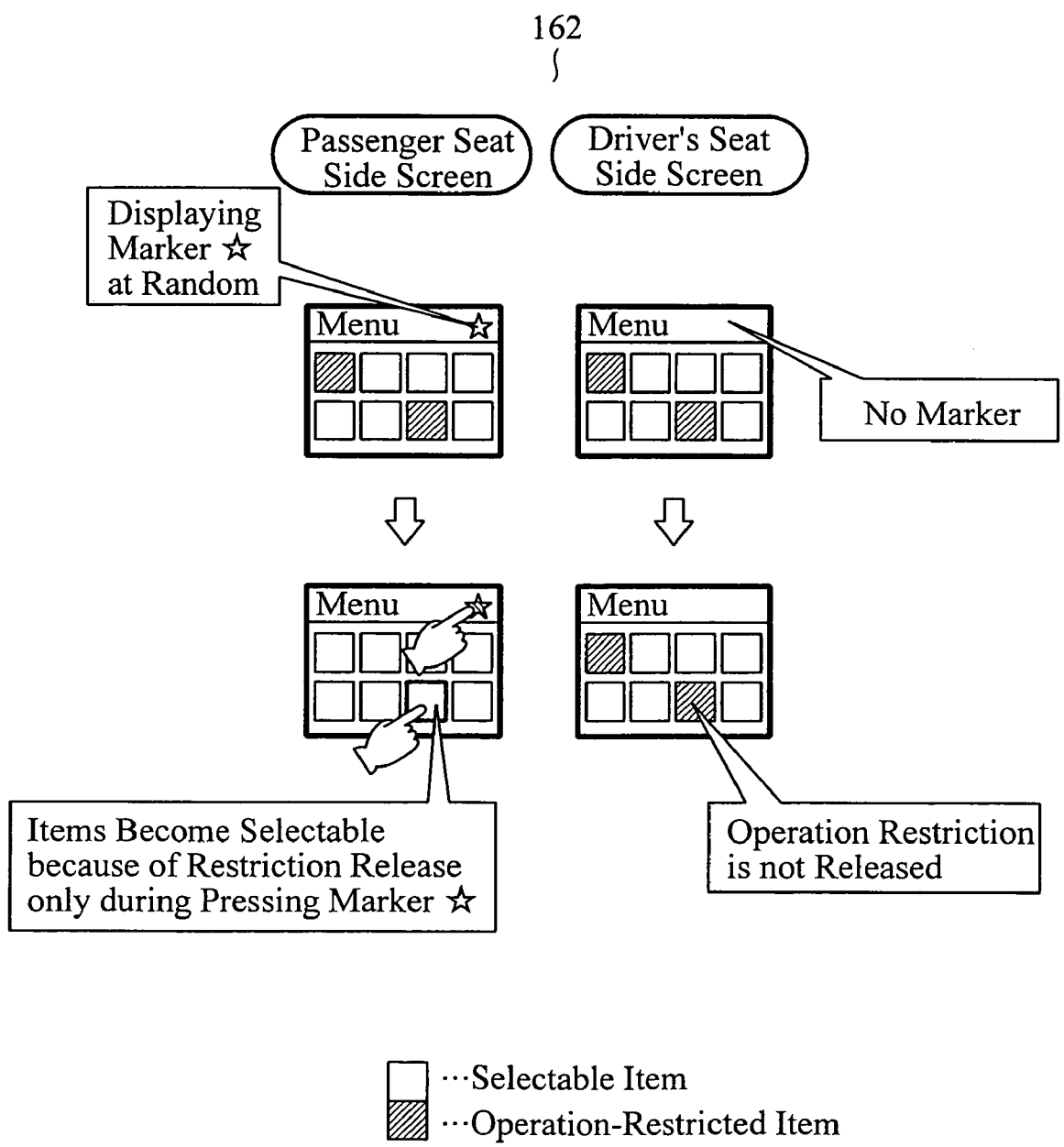
FIG. 5 is a conceptual diagram in operation based on the configuration of the menu screen of a touch-panel-equipped navigation system in accordance with the second embodiment of the invention.
Figure 6:
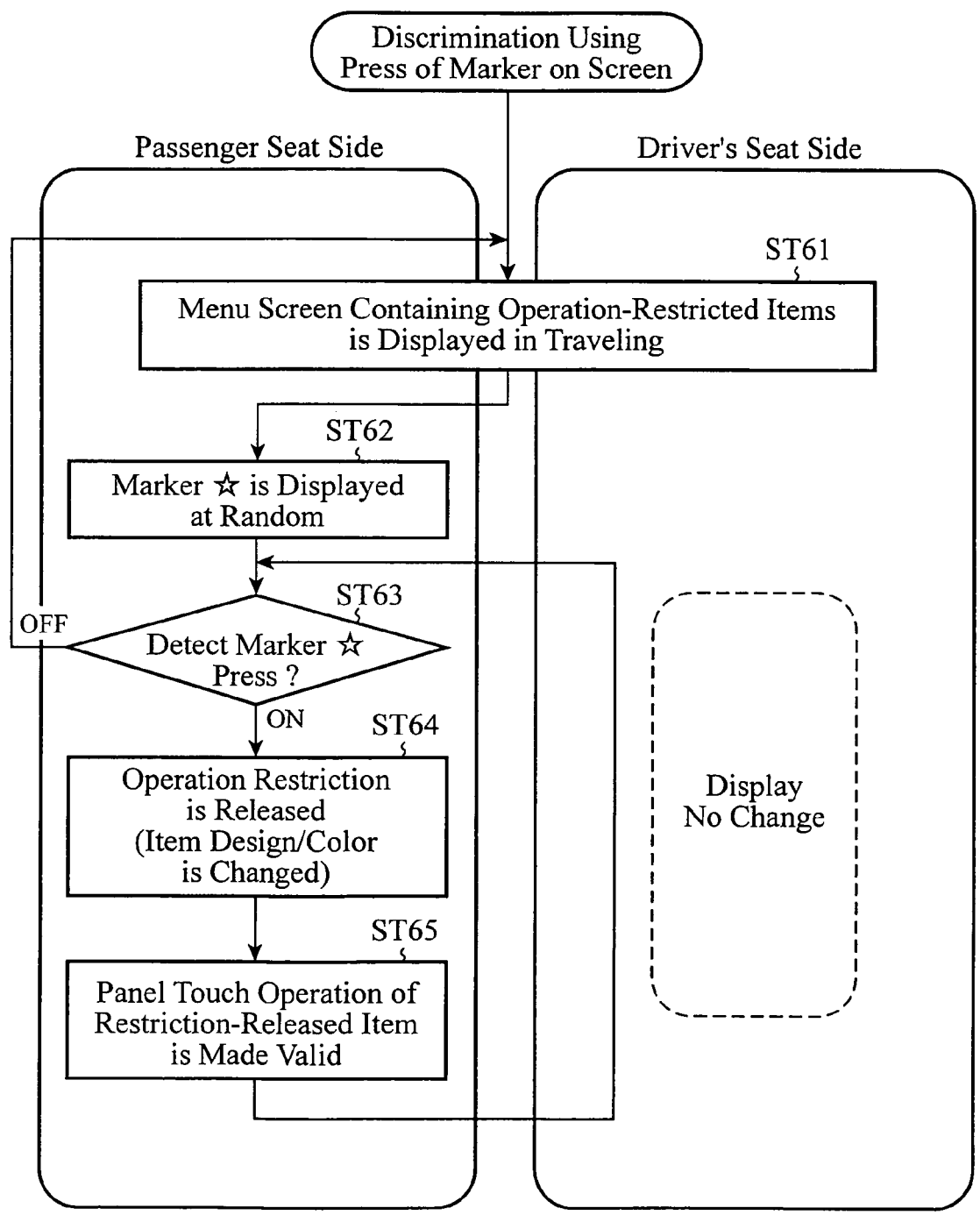
FIG. 6 is a flowchart for explaining the operations of the touch-panel-equipped navigation system in accordance with the second embodiment of the invention, cited by way of example.

FIG. 5 is a conceptual diagram in operation based on the configuration of the menu screen, and FIG. 6 shows the operations of the control section 10 seen from the passenger seat side and driver's seat side with the flowchart.

Hereinafter, the operation of the touch-panel-equipped navigation system in accordance with the second embodiment of the present invention will be explained by referring to FIG. 1, FIG. 2, FIG. 5, and FIG. 6.

As shown in FIG. 5, while the vehicle is traveling, in the LCD panel 162, the menu icons containing the operation restricted items are displayed at the same menu configuration on both of the driver's seat side screen and the passenger seat side screen. At that time, the LCD panel 162 is assumed to display the marker ☆ at any display position only on the passenger seat side screen that is not seen from the occupant on the driver's seat side under the control by the display control section 102.

At this point, in order to make valid the operation of the touch panel 145 performed by the occupant on the passenger seat side, the occupant on the passenger seat side touches the marker ☆. The operation determining section 100 of the control section 10 releases the operation restricted item of the passenger seat side screen through the operation restriction control section 101 only while the marker ☆ is touched, to thereby make valid the operation of the touch panel, and thereby, permits the occupant on the passenger seat side to select the operation restricted item.

Hereupon, changing in a random fashion the position where the marker ☆ is displayed makes it impossible to presume the display position thereof, thus reducing the possibility that the marker ☆ is operated by the occupant on the driver's seat side.

In displaying the marker ☆ at a random position, the control section 10 previously stores a plurality of display positions for candidates, which are not placed in a superposed relation with the menu icons of the operation items to which displays are already assigned, in the storing section 15 as the candidate table 112. The marker-display-position-information generating section 111 searches the candidate table 112 based on the random number generated in each case, selects a corresponding display position, generates display position information, and outputs the information to the display section 16 (the LCD panel 162). Alternatively, the marker-display-position-information generating section 111 updates the display position information (the X and Y coordinates thereof) every predetermined time, and generates and outputs the display position information of the marker ☆ on condition that the display position thereof is not placed in a superimposed relation with each of the menu icons of operation items. At that time, setting the same value at the X and Y coordinates and sequentially incrementing the value makes possible movement in an oblique direction. It should be noted that the control section 10, when detecting that there is shortage in predetermined time required for operating the touch panel 145, can delete the display of the marker ☆.

As shown in the flowchart of FIG. 6, while the vehicle is moving, the control section 10 first controls the LCD panel 162 by the display control section 102 to display menu icons containing operation restricted items in a dual view on both of the driver's seat side screen and the passenger seat side screen (Step ST61). Subsequently, the display control section 102 controls the LCD panel 162 to display the marker ☆ at the X and Y coordinates position generated and output by the marker-display-position-information generating section 111 of the passenger seat side screen (step ST62).

Meanwhile, the marker touch detector 109 of the control section 10 detects that the marker ☆ is touched, and informs it to the operation control section 100 (step ST63 "Yes"). Further, when the menu icon assigned as an operation restricted item is touched, the operation determining section 100 judges that the menu icon assigned as the operation restricted item is operated by the occupant on the passenger seat side, and controls the operation restriction control section 101 to release the operation restricted item (step ST64). The release of the operation restricted item is informed to the occupant on the passenger seat by virtue of the fact that the display control section 102 changes the design or display color of the corresponding menu icon in the LCD panel 162, thus enabling the operation of the touch panel 145 of the portion where the operation restriction is released to be made valid (step ST65). However, there occurs no change in the menu display of the driver's seat side screen at that time.

As mentioned above, in accordance with the second embodiment, detecting that the marker ☆ is touched makes it possible to make a determination about which of the occupants on the driver's seat side and the passenger seat side is operating the touch panel 145, thus enabling the restriction of the operation of the touch panel 145 by the driving occupant on the driver's seat side (driver). For this reason, there is obtained an advantageous effect that the influence exerted on the passenger seat side screen because of the operation of the touch panel 145 performed by the occupant on the driver's seat side is eliminated.

It should be understood that although the marker ☆ is shown as a marker of any shape in the second embodiment of the present invention by way of illustration, any marker can be used as long as the marker can be distinguished from other displays. Since displaying randomly the marker of any shape at any display position makes it impossible to presume the display position thereof, there is also obtained an advantageous effect that the possibility that the maker is operated by the occupant on the driver's seat side can be reduced.

Figure 7:
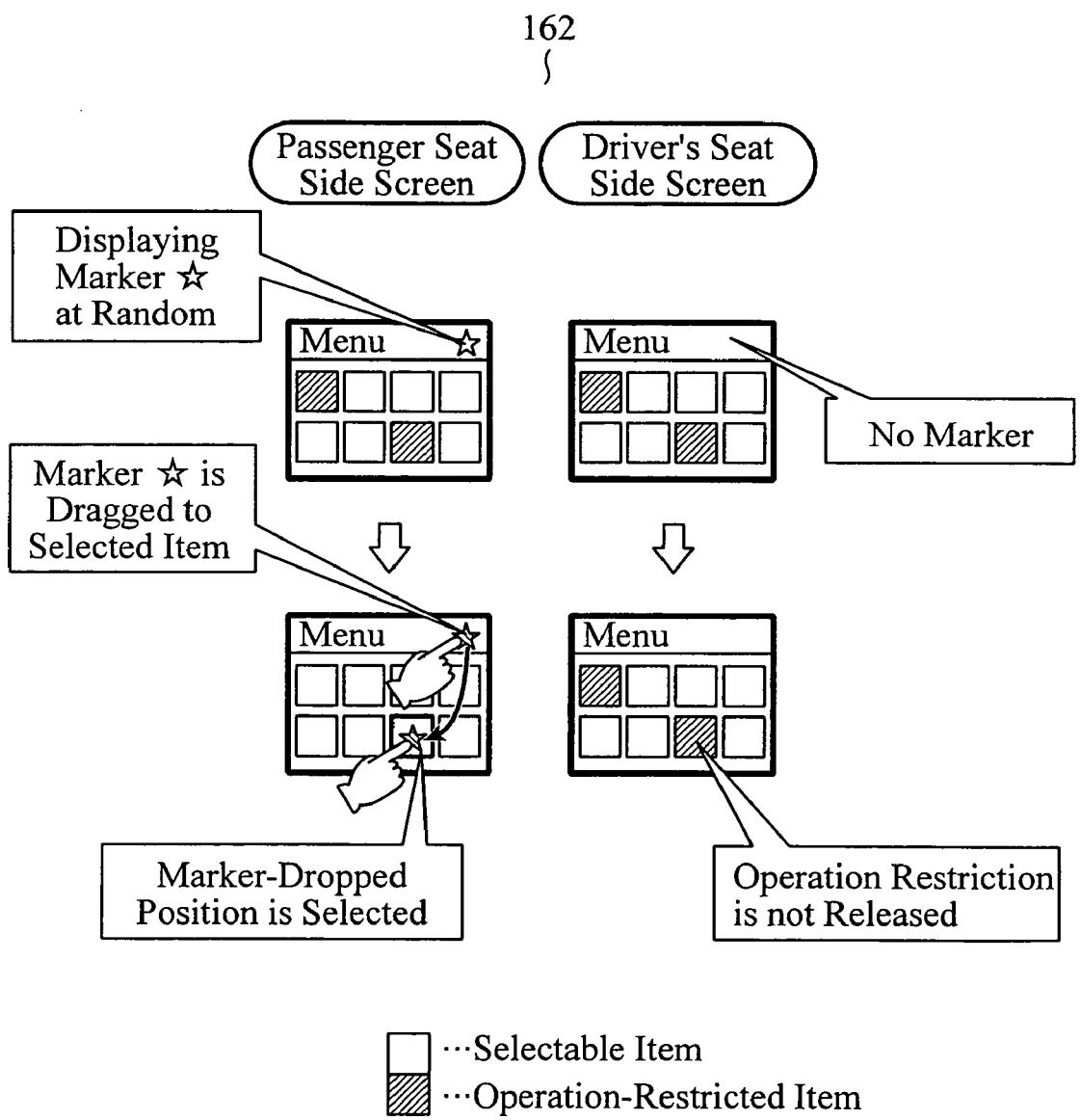
FIG. 7 is a conceptual diagram in operation based on the configuration of the menu screen of an application of the touch-panel-equipped navigation system in accordance with the second embodiment of the invention.
Figure 8:
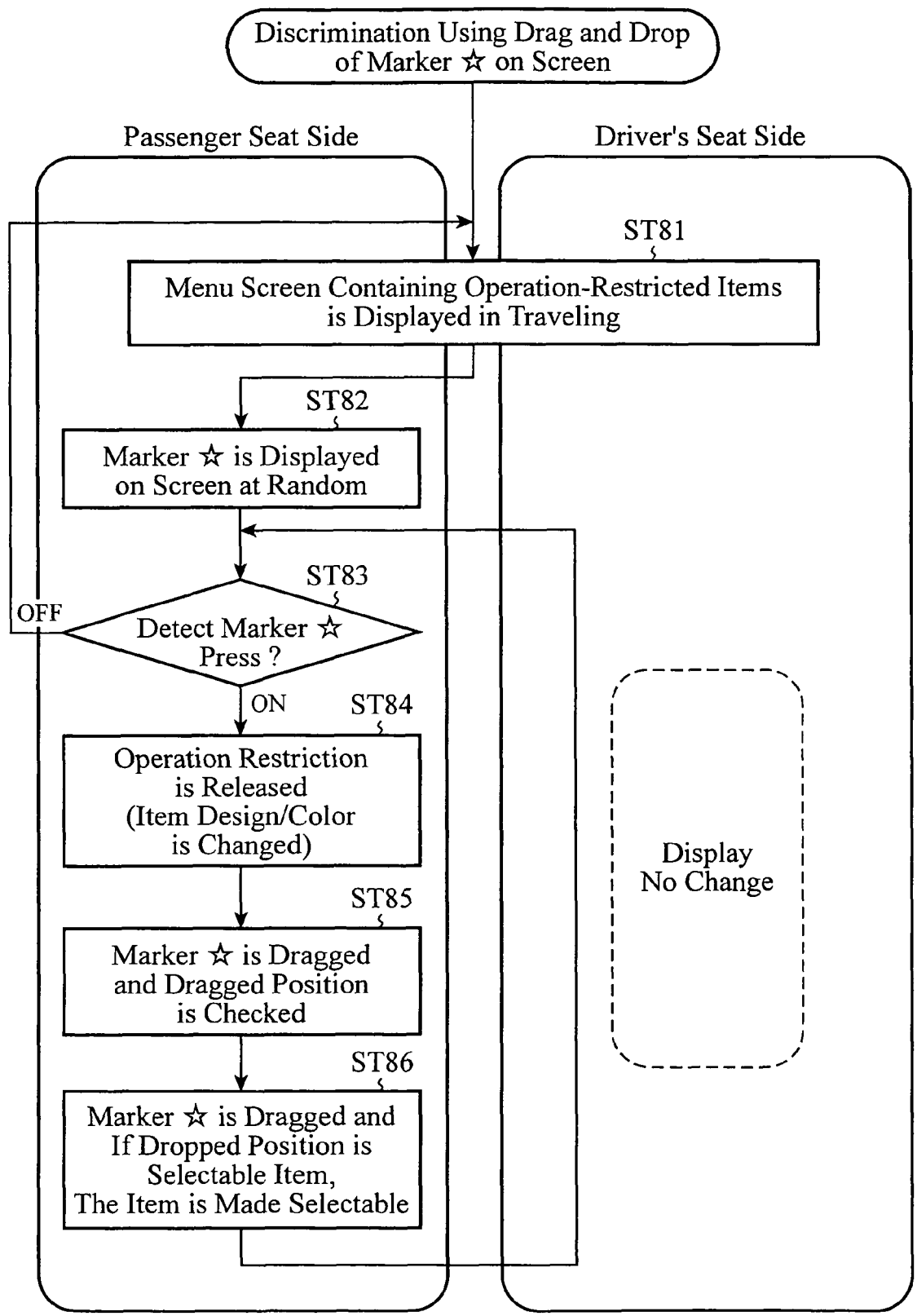
FIG. 8 is a flowchart for explaining the operations of the application of the touch-panel-equipped navigation system in accordance with the second embodiment of the invention, cited by way of example.

FIG. 7 and FIG. 8 show an application of the second embodiment where a determination about which of the occupants on the driver's seat side and passenger seat side is operating the touch panel 145 is made by using the drag and drop of the marker ☆ on the screen (the operation of moving the marker ☆ to a destination while pressing this to be released there).

As shown in FIG. 7, the display control section 102 controls the LCD panel 62 to display the menu icons containing the operation restricted items in the same menu configuration on both of the driver's seat side screen and passenger seat side screen while the vehicle is moving. However, the marker ☆ is displayed only on the passenger seat side screen as with the second embodiment. At this point, in order to make valid the operation of the touch panel 145 from the passenger seat side, the occupant on the passenger seat side drags and drops the marker ☆ displayed randomly to the menu icon showing the operation restricted item which the occupant wants to select.

By virtue of the drag-and-drop operation detector 110 detecting the drag-and-drop operation, the operation determining section 100 of the control section 10 judges that the operation of the touch panel 145 is performed by the occupant on the passenger seat side, controls the operation restriction control section 101 to release the display of the operation restricted item on the passenger seat side screen only while the marker ☆ is dragged, further judges that the display position where the maker is dropped is the position where the menu icon is selected, and thereby, permits the operation restricted item to be selected.

In the control section 10, as shown in the flowchart of FIG. 8, while the vehicle is moving, the display control section 102 first controls the LCD panel 162 to display the menu icons containing the operation restricted items in a dual view on both of the driver's seat side screen and the passenger seat side screen (Step ST81). Then, the display control section 102 outputs the marker ☆ together with the display position information outputted by the marker-display-position-information generating section 111 such that the marker ☆ is displayed at a random display position on the passenger seat side screen (step ST82).

Otherwise, when the drag-and-drop detector 110 detects the drag of the marker ☆ (step ST83 "Yes"), the operation determining section 100 of the control section 10 judges that the touch panel 145 is operated by the occupant on the passenger seat side, and controls the operation restriction control section 101 to release the operation restricted item (step ST84). The release of the operation restricted item is informed to the occupant on the passenger seat by virtue of the operation restriction control section 101 controlling the display control section 102 to change the design or display color of the corresponding menu icon in the LCD panel 162.

Subsequently, the drag-and-drop detector 110 detects the display position where the marker is dropped and outputs the information to the operation determining section 100 (step ST85), and the operation determining section 100 controls the operation restriction control section 101 to make it possible to execute the corresponding item if the display position where the marker is dropped exists on the menu icon of the selectable item (step ST86). Note that there occurs no change in the menu display of the driver's seat side screen at that time.

In accordance with the above-described application of the second embodiment, changing the display position of the marker ☆ randomly for every operation and further performing the drag-and-drop operation make it possible to judge that which is operating the touch panel 145, the occupant on the driver's seat side or on the passenger seat side, thus enabling the operation of the touch panel 145 by the driving occupant on the driver's seat side (driver) to be restricted. For this reason, there is obtained an advantageous effect that the influence exerted on the passenger seat side screen due to the fact that the occupant on the driver's seat side operated the touch panel 145 is eliminated.

It should be appreciated that the possibility that the touch panel is operated by the occupant on the driver's seat side can be furthermore reduced as compared with that of the second embodiment. Moreover, the marker may be deleted when the touch panel is not operated for a fixed time period as with the first and second embodiments.

Third Embodiment

The touch-panel-equipped navigation system in accordance with the third embodiment of the present invention is arranged such that the LCD panel 162 in the display section 16 has any number of infrared sensor arrays 164 disposed in any direction in the peripheral portion thereof. The sensor reaction pattern detector 105 of the control section 10 outputs the information detected and received through the infrared sensor array 164 to the operation determining section 100. The operation determining section 100 compares the information with the patterns stored in the pattern DB 106, and thereby, makes a determination about which occupant the menu icon of the restriction item is operated by to control the operation restriction control section 101. The operation restriction control section 101 restricts the operation of the touch panel 145 by the occupant on the driver's seat side while the vehicle is moving based on the output from the operation determining section 100, and prohibits the execution of the function by the function executing section 103 prepared corresponding to the menu icon.

In this connection, in FIG. 1, the configuration where the infrared sensor array 164 is used as the component contained in the display section 16 is explained; however, the infrared sensor array 164 may be arranged so as to be connected with the control section 10 as an external unit 17 independently from the display section 16. Further, the sensor is not limited to the infrared sensor, and can be replaced with any sensor as long as the sensor senses the movement of a human body.

Figure 9:
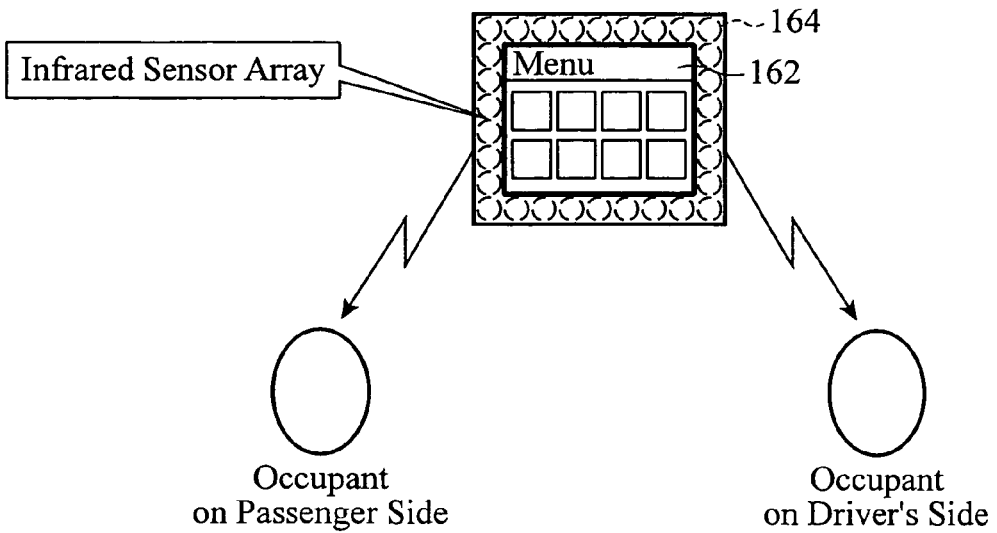
FIG. 9 is a view for explaining the peripheral portion of an LCD panel used in a touch-panel-equipped navigation system in accordance with the third embodiment of the invention, cited by way of example.
Figure 10:
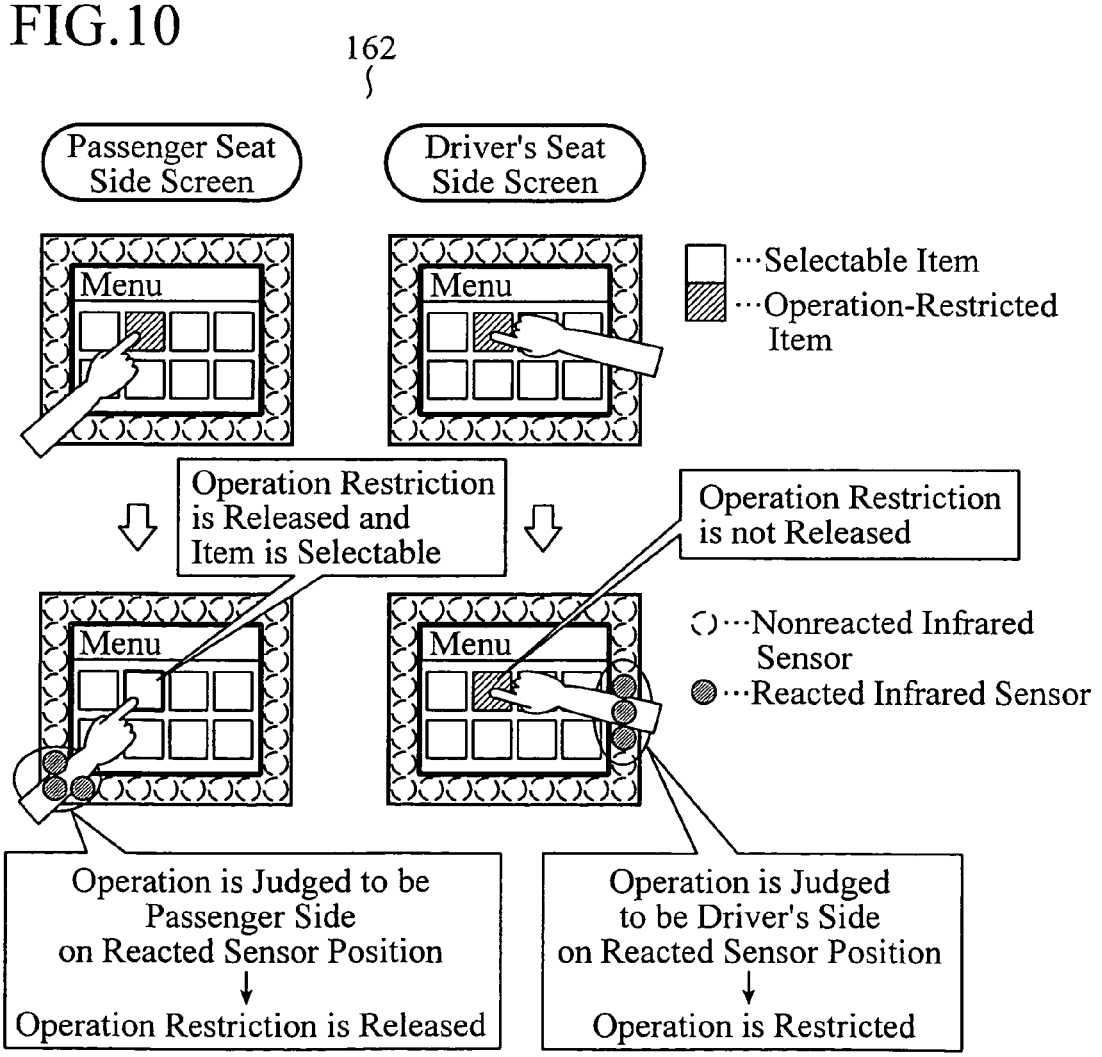
FIG. 10 is a conceptual diagram in operation based on the configuration of the menu screen of the touch-panel-equipped navigation system in accordance with the third embodiment of the invention.
Figure 11:
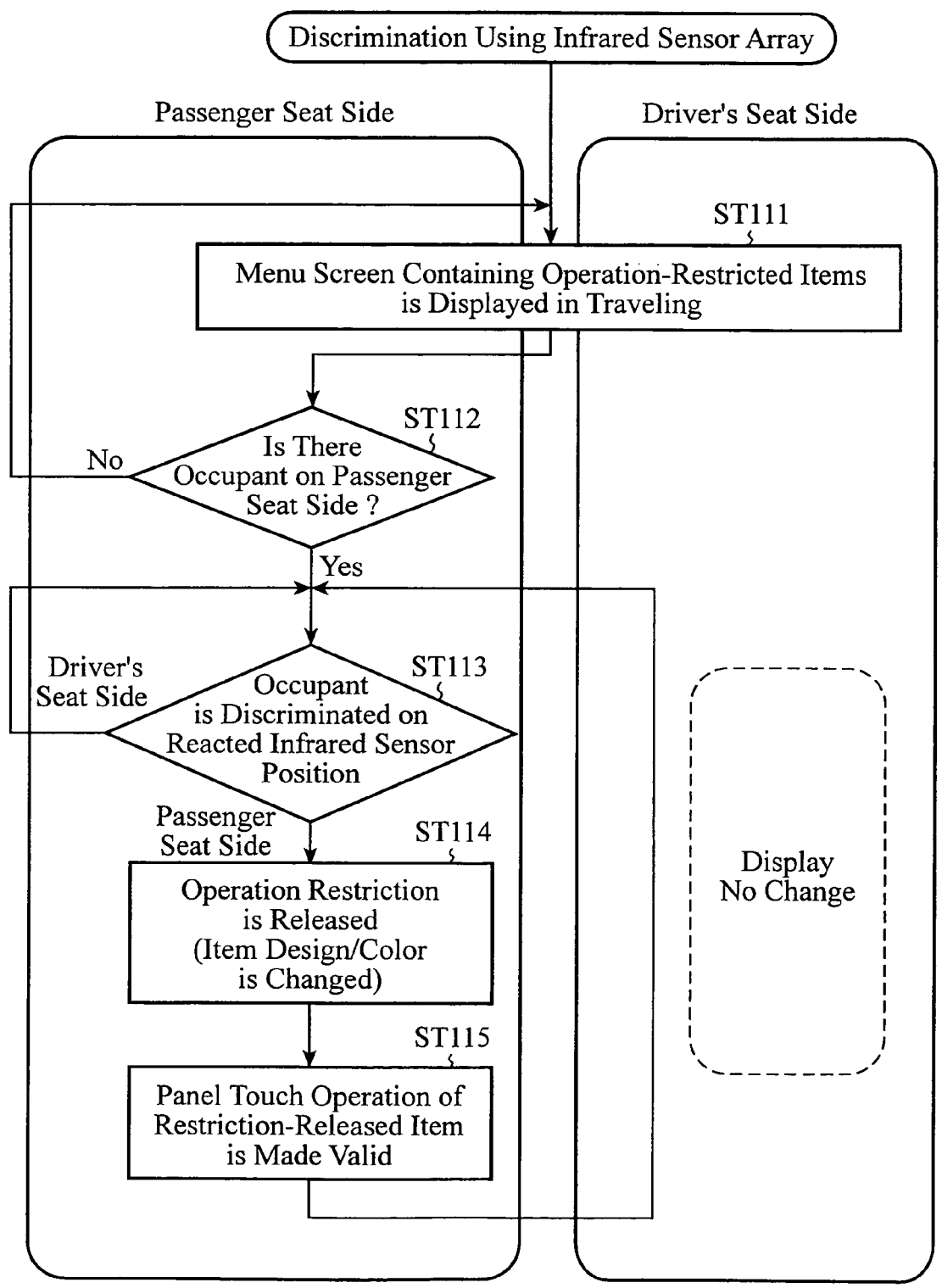
FIG. 11 is a flowchart for explaining the operations of an application of the touch-panel-equipped navigation system in accordance with the third embodiment of the invention, cited by way of example.

FIG. 9 shows the peripheral structure of the LCD panel 162, FIG. 10 is a conceptual diagram of the operation thereof shown in the configuration of the menu screen thereof, and FIG. 11 shows the operation of the control section 10 seen from the passenger seat side and the driver's seat side with a flowchart.

The operation of the touch-panel-equipped navigation system in accordance with the third embodiment of the present invention will be explained by referring to FIG. 1, FIG. 2, and FIG. 9 to FIG. 11, hereinlater.

As shown in FIG. 9, in order to make valid the operation performed by the occupant on the passenger seat side, the LCD panel 162 has a plurality of infrared sensors facing toward various directions disposed as the infrared sensor array 164 in the peripheral portion thereof.

Meanwhile, as shown in FIG. 10, under the control exercised by the display control section 102, on the LCD panel 162, are displayed the menu icons containing the operation restricted item in the same menu configuration on both of the driver's seat side screen and the passenger seat side screen while the vehicle is moving. Moreover, the sensor reaction pattern detector 105 of the control section 10 outputs a reaction pattern obtained by combining the detection results from each infrared sensor to the operation determining section 100, and the operation determining section 100 compares the reaction pattern with the patterns stored in the pattern DB 106, and thereby, discriminates the occupant having operated the touch panel 145. In FIG. 9, the mark ● denotes a reacted infrared sensor and the mark ○ denotes an unreacted infrared sensor.

The control section 10, as shown in FIG. 9, makes a determination about the presence of the occupant on the passenger seat side by the infrared sensor array 164 detecting the presence or absence of the operation of the touch panel 145 carried out by the occupants sitting on the driver's seat and the passenger seat or with the output from the seat state detector 12. If there is at this point no occupant on the passenger seat side, the passenger seat side screen is not changed, and the menu display containing the operation restricted item is continued.

In contrast, when there is an occupant on the passenger seat side, as shown in FIG. 10, a determination about the occupant having operated the touch panel 145 is made by using the positions and combined patterns of the infrared sensors that are disposed in the peripheral portion of the LCD panel 162 and reacted. When it is then judged that the occupant who operated the touch panel 145 is the occupant on the passenger seat side, the operation restriction is released, and otherwise, when it is judged that it is the occupant on the driver's seat side, the operation restriction is continued.

As shown in the flowchart of FIG. 11, the control section 10 first controls the LCD panel 162 under the control by the display control section 102, and displays menu icons containing operation restricted items in a dual view on both of the driver's seat side screen and the passenger seat side screen (Step ST111).

Subsequently, the sensor reaction pattern detector 105 acquires the reaction pattern by the infrared sensor array 164 detecting the presence or absence of the operation of the touch panel 145 performed by the occupant taking the driver's seat or the passenger seat, and outputs the information to the operation determining section 100.

The operation determining section 100 detects the presence or absence of the occupant on the passenger seat side with the reaction pattern outputted by the sensor reaction pattern detector 105 or the output obtained from the seat state detector 12 (step ST112). If there is then no occupant on the passenger seat side, the process returns to step ST111, does not change the passenger seat side screen, and continues the menu display containing the operation restricted items.

Otherwise, when there is an occupant on the passenger seat side, the operation determining section 100 furthermore makes a determination about the occupant who operated the touch panel 145 by comparing the reaction pattern of the infrared sensors outputted by the sensor reaction pattern detector 105 with the patterns stored in the pattern DB 106 (step ST113).

Hereupon, when it is judged that the occupant on the passenger seat side operated the touch panel 145 in step ST113, the operation restriction control section 101 releases the operation restricted item, and controls the menu-icon function executing section 103 (step ST114). It should be appreciated that the release of the operation restricted item is informed to the occupant of the passenger seat by virtue of the display control section 102 changing the design or display color of the corresponding menu icon displayed in the LCD panel 162. Thereby, the operation of the touch panel 145 of the portion where the operation restriction is released can be made valid (step ST115). In passing, there occurs no change in the menu display of the driver's seat side screen at that time.

As described above, in accordance with the third embodiment, the infrared sensor array 164 provided in the peripheral portion of the LCD panel 162 enables making a determination about which of the occupants on the driver's seat side and the passenger seat side is operating the touch panel 145, and enables restricting the operation of the touch panel 145 by the driving occupant on the driver's seat side (driver). Therefore, there is obtained an advantageous effect that the influence exerted on the passenger seat side screen due to the fact that the occupant on the driver's seat side operates the touch panel 145 is eliminated.

It should be understood that the infrared sensor array 164 is here arranged so as to be disposed in the peripheral portion of the LCD panel 162; however, disposing the array in the peripheral portion of the touch panel 145 also brings about a similar effect.

Fourth Embodiment

A touch-panel-equipped navigation system in accordance with the fourth embodiment of the present invention is arranged such that a monitor camera is provided at a position in a vehicle where the camera can monitor the direction toward which the face of the occupant on the driver's seat side is facing, e.g., behind a room mirror. The operation determining section 100 of the control section 10 makes a determination about the direction toward which the face of the occupant on the driver's seat side is facing based on the result obtained by virtue of the monitoring camera 172 shooting an image, the image information acquiring 107 acquiring the image, and the image recognizing section 108 recognizing the image, thereby makes a determination about which occupant operated the menu icon of the restricted item, and restricts the operation of the touch panel 145 by the occupant on the driver's seat side while the vehicle is moving by the operation restriction control section 101.

Figure 12:
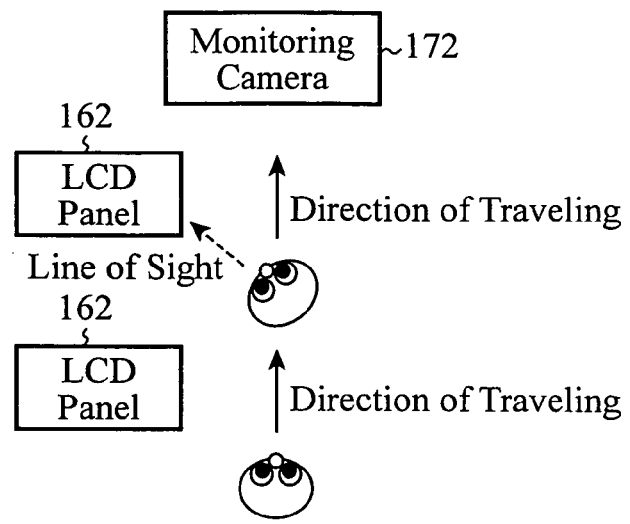
FIG. 12 is a view for explaining the relation between an occupant and a monitor camera used in a touch-panel-equipped navigation system in accordance with the fourth embodiment of the invention, cited by way of example.
Figure 13:
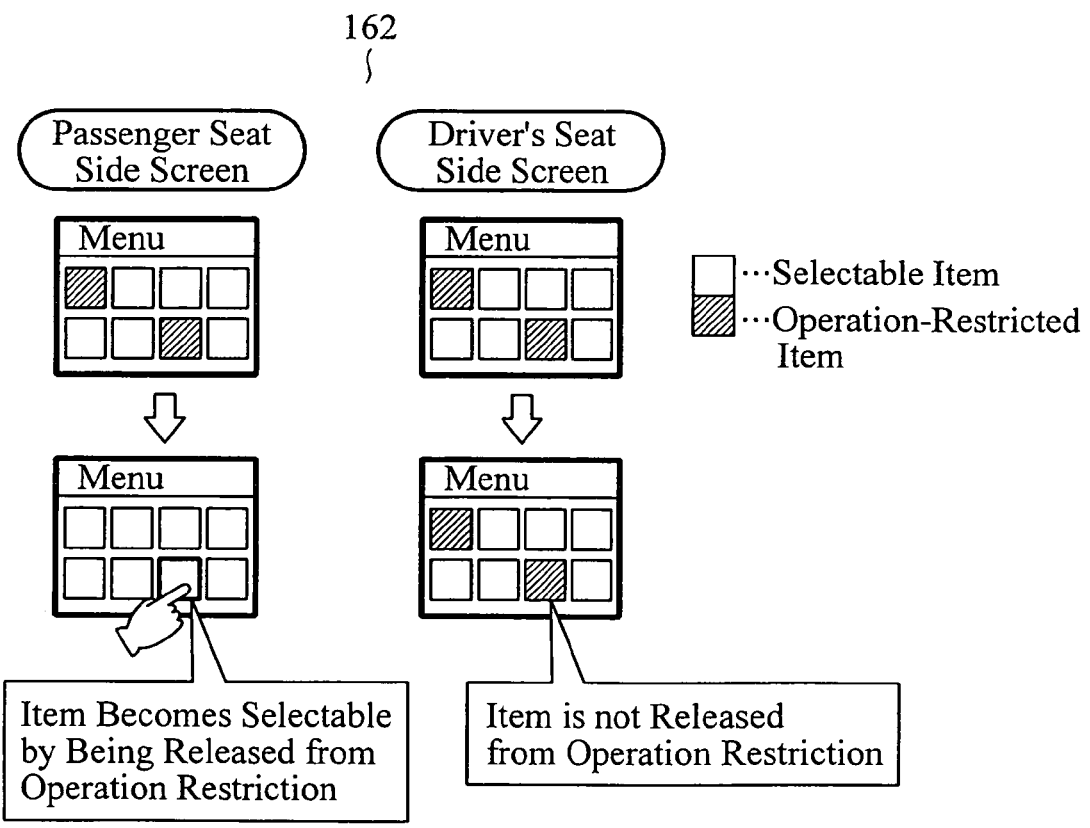
FIG. 13 is a conceptual diagram in operation based on the configuration of the menu screen of the touch-panel-equipped navigation system in accordance with the fourth embodiment of the invention.
Figure 14:
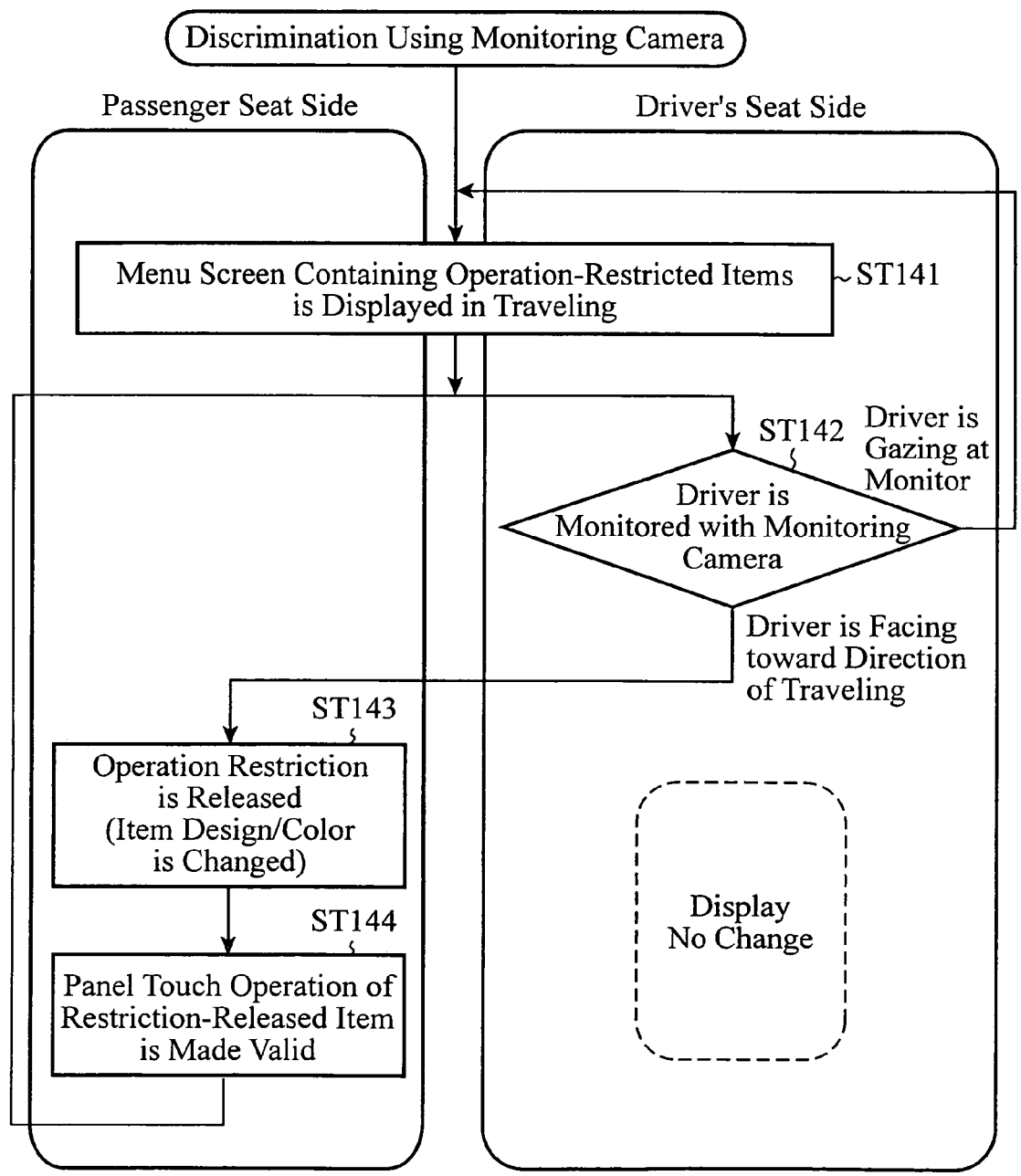
FIG. 14 is a flowchart for explaining the operations of an application of the touch-panel-equipped navigation system in accordance with the fourth embodiment of the invention, cited by way of example.

FIG. 12 shows the relation between the monitor camera and the driver's seat occupant; FIG. 13 is a conceptual diagram of the operation thereof shown in the configuration of the menu screen thereof; and FIG. 14 shows the operation of the control section 10 seen from the passenger seat side and the driver's seat side with a flowchart.

The operation of the touch-panel-equipped navigation system in accordance with the fourth embodiment of the present invention will be explained by referring to FIG. 1, FIG. 2, and FIG. 12 to FIG. 14 hereinlater.

As shown in FIG. 13, the display control section 102 of the control section 10 controls the LCD panel 162 to display the menu icons containing the operation restricted items in the same menu configuration on both of the driver's seat side screen and the passenger seat side screen while the vehicle is moving. At this point, in order to make valid the operation performed from the passenger seat side, the operation determining section 100 monitors the direction toward which the face of the occupant on the driver's seat side is facing based on the image that is shot by the monitoring camera 172, received by the image information acquiring 107, and recognized by the image recognizing section 108.

As shown in FIG. 12, the operation determining section 100, when the occupant on the driver's seat side fixes the eyes on the driver's seat side screen, judges that the occupant is performing an operation for the navigation, and does not release the operation restricted item by the operation restriction control section 101. In contrast, when the occupant on the driver's seat side is gazing toward the direction of traveling (forward), the operation determining section judges that the occupant is driving the vehicle, releases the operation restriction of the passenger seat side screen by the operation restriction control section 101, and thereby makes valid the operation of the touch panel 145 of the portion where the operation restriction is released, thus executing predetermined functions by the menu-icon function executing section 103.

As shown in the flowchart of FIG. 14, the display control section 102 of the control section 10 controls the LCD panel 162 while the vehicle is moving to display the menu icons containing the operation restricted items in a dual view on both of the driver's seat side screen and the passenger seat side screen (Step ST141). After that, the image information acquiring section 107 acquires the image shot by the monitor camera 172, the image recognizing section 108 recognizes the image, and then the image information acquiring section outputs the result of image recognition to the operation discriminating section 100.

The image recognizing section 108 judges by the image recognition whether the face of the occupant on the driver's seat side is facing toward the direction of traveling or the occupant gazes at the driver's seat side screen (step ST142). In this case, when it is judged that the driver's seat side occupant is gazing at the driver's seat side screen, the operation determining section 100 determines that the occupant on the driver's seat side is operating for the navigation, and continues the above-described process of step ST141 not to release the operation restricted item.

Otherwise, when it is judged that the occupant on the driver's seat side is facing toward the direction of traveling (forward) by the image recognizing section 108, the operation determining section 100 determines that the occupant on the driver's seat side is driving, and releases the operation restriction of the passenger seat side screen by the operation restriction control section 101 (step ST143), thus making valid the operation of the touch panel 145 of the portion where the operation restriction is released and enabling the execution of predetermined functions by the menu-icon function executing section 103 (step ST144).

It should be appreciated that the release of the operation restriction of the passenger seat side screen is informed to the occupant of the passenger seat by virtue of the display control section 102 changing the design or display color of the corresponding menu icon displayed in the LCD panel 162. Say in addition, there occurs no change in the menu display of the driver's seat side screen at that time.

As described above, the fourth embodiment permits the determination to be made about which of the occupants on the driver-'s seat side and the passenger seat side is operating the touch panel 145, and thereby allows the operation of the touch panel 145 by the driving occupant on the driver's seat side (driver) to be restricted, by virtue of the monitoring camera 172 disposed at any position where the camera can monitor the direction toward which the face of the occupant on the driver's seat side is facing, taking the images thereof and the obtained image information being recognized. For this reason, there is obtained an advantageous effect that the influence exerted on the passenger seat side screen due to the fact that the occupant on the driver's seat side operates the touch panel 145 is eliminated.

As mentioned above, the present invention prevents the occurrence of the situation where an unintended image is displayed on the passenger seat side screen by virtue of the fact that the control section 10 makes a judgment about which occupant the menu icon of the operation restricted item is operated by, while the vehicle is moving, by using any means of (1) the operation of the push switch 171 provided at a position where only the occupant on the passenger seat side can operate, (2) the touch operation or drag-and-drop operation of a marker of any shape displayed at any position of the passenger seat side screen, (3) monitoring by the infrared sensor array 164 disposed in the peripheral portion of the LCD panel 162, and (4) monitoring the occupant on the driver's seat side by the monitoring camera 172 disposed at a position where the camera can monitor the direction toward which the face of the occupant on the driver's seat side is facing, and thereby, the control section makes invalid the operation of the touch panel 145 related to the operation restricted item by the occupant on the driver's seat side while the vehicle is moving.

It should be understood that all of the flowcharts shown in each of FIG. 4, FIG. 5, FIG. 7, FIG. 11, and FIG. 14 are achieved by virtue of the control section 10 reading out and executing the programs, one by one, stored in the ROM (not shown) included therein, and the control section there makes a determination about which occupant the touch panel 145 is operated by, and makes invalid the operation of the touch panel related to the operation restricted item by the occupant on the driver's seat side while the vehicle is moving.

INDUSTRIAL APPLICABILITY

As mentioned above, since the display system and the method of restricting an operation in the system according to the present invention can prevent the occurrence of the situation where an unintended image is displayed on the passenger seat side by making a judgment about which occupant the menu of the operation restricted item is operated by, when a dual view is displayed, and thereby making invalid the operation of the touch panel related to the operation restricted item by the occupant on the driver's seat side while the vehicle is moving, the display system and the method of restricting the operation therein are suitable, for instance, for use in a touch-panel-equipped navigation system using a dual view liquid crystal display.

The invention claimed is:

1. A display system comprising:
   a display means that simultaneously displays an image having a first viewing angle and an image having a second viewing angle other than the first viewing angle, and that has an operation face provided on the display screen thereof;
   an operator discriminating means discriminating one operator of the operation face of the display means from the other thereof;
   a traveling state judging means making a judgment whether a vehicle is in a traveling one; and
   a control means causing the display means to display a menu image of operation items containing an operation restricted item of the same menu configuration at both of the first viewing angle and the second viewing angle, and when the operator discriminating means determines that an operation is the operation performed by a driver and the traveling state judging means judges that the vehicle at that time is in a traveling state, making invalid an operation related to the operation restricted item contained in the operation items having the first viewing angle which the display means is caused to display;
   wherein the control means displays a marker of any shape at a display position that is not in a superposed relation with the operation item menu through the display means, releases the operation restriction related to the operation restricted item included in the image having the second viewing angle when the control means detects that the marker is operated through the operation face, and makes valid the operation of the operation face of the display means performed by the occupant other than the driver.

2. The display system according to claim 1, wherein in displaying a marker, the control means displays the marker at a predetermined cycle or every time one screen display is switched to another.

3. The display system according to claim 1, wherein in displaying a marker at any random position, the control means prepares as candidates a plurality of display positions that are not in a superposed relation with the position where the menu image of operation items is displayed, and selects and displays a position from the candidates according to the random number to be generated.

4. The display system according to claim 3, wherein in displaying the marker at any random position, the control means updates the display position every predetermined time, and only in the case where the updated display position is the one not in a superposed relation with the display position of the menu image of operation items, the control means displays the marker.

5. The display system according to claim 1, wherein when the control means detects that the marker is dragged and dropped, and the position of the menu where the marker is dropped coincides with the position where the operation restricted item is displayed, the control means releases the restriction of operation related to the corresponding operation restricted item contained in the image having the second viewing angle, thus making valid the operation of the operation face of the display means.

6. The display system according to claim 1, wherein when the control means detects that there is shortage in a predetermined time required for operating the operation face, the control means deletes the marker display.

7. The display system according to claim 1, wherein the control means takes an image indicating the direction toward which the face of the driver is facing through a monitoring camera, and makes a judgment based on the recognition result of the taken image.

8. The display system according to claim 1, wherein the driver discriminating means includes an infrared sensor provided in the peripheral portion of the display means.

9. A display system comprising:
   a display means that simultaneously displays an image having a first viewing angle and an image having a second viewing angle different from the first viewing angle, and that has an operation face provided on the display screen thereof;
   an operator distinguishing means distinguishing the operator of the operation face of the display means;
   a traveling state judging means judging a traveling state; and
   a control means displaying a menu image of operation items containing an operation restricted item of the same menu configuration at both of the first viewing angle and the second viewing angle, and when the operator discriminating means determines that an operation is the operation performed by a driver and the traveling state judging means judges that the vehicle at that time is in a traveling state, makes invalid an operation related to the operation restricted item contained in the operation items having the first viewing angle which the display means is caused to display;
   wherein when the control means displays a marker of any shape at any display position at random through the display means, and detects that the marker is operated through the operation face, it releases the restriction of operation related to the operation restricted item contained in the image having the second viewing angle, and makes valid the operation of the operation face of the display means performed by an occupant other than the driver.

10. The display system according to claim 9, wherein in displaying a marker, the control means displays the marker at a predetermined cycle or every time one screen display is switched to another.

11. The display system according to claim 9, wherein when the control means detects that the marker is dragged and dropped and the position of the menu where the marker is dropped coincides with the position where the operation restricted item is displayed, it releases the restriction of operation related to the corresponding operation restricted item contained in the image having the second viewing angle, thus making valid the operation of the operation face of the display means.

12. The display system according to claim 9, wherein when the control means detects that there is shortage in a predetermined time required for operating the operation face, it deletes the marker display.

13. The display system according to claim 9, wherein the control means takes an image indicating the direction toward which the face of the driver is facing through a monitoring camera, and makes a judgment based on the recognition result of the taken image.

14. The display system according to claim 9, wherein the driver discriminating means includes an infrared sensor provided in the peripheral portion of the display means.

15. A method of restricting an operation in a display system including a display means that simultaneously displays an image having a first viewing angle and an image having a second viewing angle other than the first viewing angle, and that has an operation face provided on the display screen thereof,
wherein a control apparatus controlling the display system performs the steps of:
causing the display means to display the menu image of operation items containing an operation restricted item of the same menu configuration at both of the first viewing angle and the second viewing angle;
displaying a marker of any shape at a display position that is not in a superposed relation with the operation item menu through the display means and detecting whether the marker is detected through the operation face; and
judging that an operation is the operation performed by a driver when the control apparatus did not detect that the marker is operated in that step, further making invalid an operation related to the operation restricted item contained in the operation items having the first viewing angle which the display means is caused to display when the control apparatus judges that the vehicle is in a traveling state, and releasing the restriction of operation related to the operation restricted item contained in the image having the second viewing angle to make valid the operation of the operation face of the display means performed by an occupant other than the driver when the control means detected that the marker is operated.

16. A method of restricting an operation in a display system including a display means that simultaneously displays an image having a first viewing angle and an image having a second viewing angle other than the first viewing angle, and that has an operation face provided on the display screen thereof,
wherein a control apparatus controlling the display system performs the steps of:
causing the display means to display the menu image of operation items containing an operation restricted item of the same menu configuration at both of the first viewing angle and the second viewing angle;
displaying a marker of any shape on a random basis at any display position, and detecting whether the marker is operated through the operation face; and
judging that an operation is the operation performed by a driver when the control apparatus makes no detection that the marker is operated in that step, further making invalid an operation related to the operation restricted item contained in the operation items having the first viewing angle which the display means is caused to display when the control apparatus judges that the vehicle is in a traveling state, and releasing the restriction of operation related to the operation restricted item contained in the image having the second viewing angle to make valid the operation of the operation face of the display means performed by an occupant other than the driver when the control means detected that the marker is operated.

* * * * *